CASETTE ENCAPSULATING MAGNETIC RECORDING TAPE
Filed Oct. 13, 1969
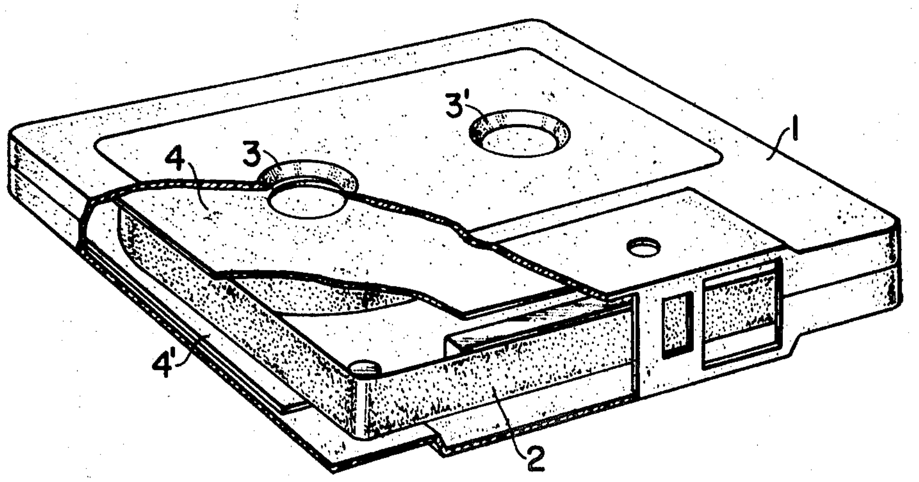

3,606,203
CASETTE ENCAPSULATING MAGNETIC RECORDING TAPE

Goro Akashi, Masaaki Fujiyama, and Takashi Hirakawa, Kanagawa, Japan, assignors to Fuji Photo Film Co., Ltd., Kanagawa, Japan Filed Oct. 13, 1969, Ser. No. 865,711
Claims priority, application Japan, Oct. 12, 1968, 43/74,388
Int. Cl. G03b *1/04;* B11b *15/32, 23/04*
U.S. Cl. 242—199 5 Claims

ABSTRACT OF THE DISCLOSURE

A cassette enclosing a magnetic tape wherein the cassette contains a plastic regulating plate. The plastic regulating plate contains finely divided particles dispersed therein.

BACKGROUND OF THE INVENTION

(1) Field of the invention

The present invention relates to a cassette enclosing a magnetic recording tape.

(2) Prior art

The structure of the conventional magnetic recording tape generally comprises a magnetic recording layer coated on a substrate such as a film support, such as cellulose diacetate, cellulose triacetate, polyethylene terephthalate, or polyvinyl chloride, or on a wire support of a non-magntic metal. This magnetic recording layer (hereinafter referred to as "magnetic layer") comprises $\gamma$-$Fe_2O_3$, generally of a high hardness of 5 on the mohs' scale, dispersed in a binding agent, with the amount of $\gamma$-$Fe_2O_3$ used in the magnetic layer being in the range of 70 to 80% by weight. Therefore, the magnetic recording tape not only is a recording material but also, in view of its mechanical properties, can be used as an abrasive. This can be easily seen since $\alpha$-$Fe_2O_3$ (red iron oxide), resembling the magnetic material in chemical structure, has a hardness of from 5 to 5.5 on the mohs' scale and is used as an abrasive.

The composition of newer magnetic recording layers has changed from $\gamma$-$Fe_2O_3$ to an alloy comprising a Fe-Co, a Co-Ni, or a Fe-Co-Ni system, or a thin film of an comprising a Fe-Co-Ni system will be used as the magnetic layer itself. Thus, the magnetic layer of the future will be considered to be extremely high in hardness. In addition, the magnetic recording tape is supported by a guide pole of the tape recorder and then transported on the tape recorder. Use of the magnetic recording layer results in abrasion of the guide pole. Of even greater concern is the high speed winding and rewinding operations used in recording and reproduction of the magnetic recording material. In the situations above, the velocity of the recording material in such operations is higher by about 30 times than that encountered in the usual recording and reproducing operations. As a result, the guide pole is abraded to a greater degree at higher speeds. This problem exists with the guide pole as described above, but also with recently developed cassette, enclosing a magnetic recording tape.

The attached drawing is a view showing a partially-cut cross-section of a conventional cassette enclosing a magnetic reecording tape.

As shown in the attached drawing, in a cassettee 1, a tape 2 is wound on winding core hubs 3 and 3'. A tape regulating plate formed by flexible plastic sheets 4 and 4' is provided in a zone corresponding to the conventional reel flange and the tape 2 is wound from one hub to another hub in the usual operation. In this case, the regulating plates 4 and 4' are fixed, but the hub 3 or 3' rotates with the tape 2. Thus, the regulating plates 4 and 4' are subject to a rubbing force from the edge of magnetic tape and are worn away as with the above-described guide pole. In such cases, the degree of unevenness of the edge of the magnetic tape is much higher than that of the recording surface of a magnetic tape and is known to abrade the flexible regulating plates 4 and 4' due to the high hardness of the magnetic recording layer containing $\gamma$-$Fe_2O_3$, e.g. the regulating plate are shaved as if with the blade of a saw.

The materials used for the elements of the instrument contacting the recording surface or the edge of the magnetic tape have been conventionally selected from hard chromium-plated materials, stainless steel, and Teflon, a polyfluorethylene polymer. Teflon has been used as a material for the regulating plate in cassettes. The Teflon sheet has been quite practical. The combination of a Teflon sheet and a Teflon tape is excellent since the frictional resistance of a fixed Teflon sheet and a running tape is low due to the low coefficient of friction of Teflon. However, the endurance of the Teflon sheet has a lifetime of only 200 to 300 windings and rewindings (hereinafter called ductability), and it has been found that, with windings and rewindings above this level, the surface of Teflon becomes very rough. Heretofore, it was thought that the use of a Teflon sheet was impossible since the Teflon sheet is high in frictional electrification due to its high electric resistance of above $10^{15}$ ohms. Therefore, to counteract this problem, a material containing carbon black has recently been used for reducing the electric resistance. However, this elevated the practical durability of the Teflon sheet to 350 to 400 windings and rewindings only.

DESCRIPTION OF THE INVENTION

On consideration of the deterioration in durability in cassettes, it was found that the deterioration is caused by the abrasion resistance of the Teflon itself rather than by the electrification of the Teflon. That is, the abrasion resistance of Teflon theoretically was considered to be very low because its coefficient of friction was low. However, it was found that the unusual abrasion of Teflon sheets is caused by a lack of hardness and the Teflon sheet is violently abraded due to the unevenness of the edge of the magnetic recording tape.

To solve these known problems, it was found that a Teflon sheet containing dispersed particles of $Cr_2O_3$, $Al_2O_3$, SiC, or $\gamma$-$Fe_2O_3$ and the like, having an average particle size of below $10\mu$ and a mohs' hardness of above 5 has an extremely excellent durability. Thus, the present invention relates to a cassette containing an enclosed magnetic recording tape and at least one regulating plate, in which the regulating plate contacts the side face of the magnetic recording tape during winding. The regulating plate used is a plate containing dispersed finely divided particles, having a hardness of above 5 on the mohs' scale, dispersed in the plastic.

The method whereby the particles are added to the plastic does not require any chemical reaction, but may be accomplished by mixing and dispersing. In case the hardness of the powder or particles to be added to the plastic of the plate is lower than that of the magnetic material used in the tape, its use is less effective. As a result, the finely divided powder to be added desirably should have a mohs' hardness of above 5. A powder having a mohs' hardness of above 7 has remarkable durability. In addition, the particle size of the fine powder used has an important influence upon the ease with which the plastic sheet used in making the regulating plate can be processed, although not appreciably affecting durability, and, as a result, the average particle size to be used is preferably below 10$\mu$.

The present invention will be illustrated in detail by reference to the examples and comparative example given herein:

Comparative example

A substrate of about 0.5$\mu$ in dry thickness was prepared on a polyethylene terephthalate film of 12$\mu$ in thickness. A magnetic coating liquid, containing finely divided needled $\gamma$-$Fe_2O_3$ particles of 0.6 in average particle size dispersed in the direction of length in a binding agent with the content of the powder being 71% by weight, was coated on the film so as to be about 6.5$\mu$ in dry thickness and then was dried. This coated material was cut to make a magnetic recording tape of 3.81 mm. in width and about 90 m. in length. The tape was positioned between two flexible sheet-like regulating plates made of pure Teflon of 50$\mu$ in thickness in a conventional cassette ("Compact Cassette," a cassette enclosing a magnetic recording tape and sold by Phillips Company of Holland).

The cassette, enclosing a magnetic recording tape and produced as above, was placed in a magnetic tape recording apparatus and the high speed running of the magnetic tape was tested by repeated high speed windings and rewindings at 90 m./70 seconds as the tape running velocity. The durability is defined as the number of times the tape can be run its entire length in less than 180 seconds or until the tape becomes impossible to run.

The result was that the number of times the tape could be run in less than 180 seconds was 346 repeated runnings. The tape became impossible to run after 370 repeatings. On opening the cassette and inspecting the regulating plate, remarkable scratching was found thereon. Therefore, from the result measured under such condition, the durability material used as the regulating plate of this cassette is recognized to be about 370 times.

Example I

The same cassette enclosing a magnetic recording tape as used in the above Comparative example was made except the material used in the regulating plate was changed. The material used as the regulating plate was Teflon in which solid finely divided particles, as shown in Table 1, were dispersed at a volume ratio of 12 per 100 to Teflon was used. The durability life of the cassette enclosing a magnetic recording tape so prepared was tested as in the comparative example.

The results obtained are as shown in Table 1.

TABLE 1

| | Mohs' hardness | Average particle size, $\mu$ | Added amount (volume percent) | Durability life (times) |
|---|---|---|---|---|
| Solid powder: | | | | |
| $Cr_2O_3$ | 9 | 0.82 | 12 | >1,000 |
| $Cr_2O_3$ | 9 | 1.17 | 12 | >1,000 |
| $Cr_2O_3$ | 9 | 2.41 | 12 | >1,000 |
| $Al_2O_3$ | 8 | 0.78 | 12 | >1,000 |
| $Al_2O_3$ | 8 | 1.26 | 12 | >1,000 |
| SiC | 9.5 | 2.15 | 12 | >1,000 |
| $\alpha$-$Fe_2O_3$ | 5.5 | 2.55 | 12 | 650 |
| $\alpha$-$Fe_2O_3$ | 5.7 | 1.08 | 12 | 590 |
| $SiO_2$ | 7 | 0.8 | 12 | >1,000 |
| Comparative example cassette | | | 0 | 370 |

From the results shown in Table 1 above, the cassette enclosing a magnetic recording tape according to the present invention is much higher in durability than that of the cassette of the comparative example. From these results, it can be seen that the solid particles used in the present invention should be above 5 in mohs' hardness. From a practical standpoint, the test of durability was discontinued after a durability of 1000 times had been reached. The surface of the Teflon sheet regulating plate, containing the particles of above 5 in hardness according to the present invention, were compared with the surface of the Teflon sheet regulating plate containing no added particles after testing for durability. The portion of Teflon sheet contacting the edge of the magnetic tape in the case of the Teflon sheet containing no added particles was found to be worn away in circumference and, in an extreme case, to be worn out. With the Teflon sheets utilizing the particles, little or no abrasion was observed. However, with the Teflon sheet containing $\alpha$-$Fe_2O_3$ of 5 to 5.5 in mohs' hardness, about half of the abrasion of the Teflon sheet having no dispersed particles was observed.

Example II

A cassette enclosing a magnetic recording tape was prepared in the same manner as in Example I to test the effect of varying the amount of dispersed particles of above 5 in mohs' hardness added to the plastic sheet regulating plate.

Table 2 shows the effect of adding $Cr_2O_3$ of 1.17$\mu$ in average particle size. Unexpectedly, $Cr_2O_3$ was found to be effective at a level of only 2%. When the $Cr_2O_3$ content is more than 2%, a durability of above 1000 times was observed. However, if the $Cr_2O_3$ content is more than 30%, the ease with which the plastic can be processed was poor, and then the test was discontinued.

TABLE 2

| Content of $Cr_2O_3$ (vol. percent) | Regulating plate material (times of repeating) | | | | |
|---|---|---|---|---|---|
| | Delrin (a polyacetal resin) | Teflon (a polytetrafluoroethylene) | Nylon (a polyamide) | Polyethylene | Polypropylene |
| 2 | 450 | 920 | 650 | 540 | 530 |
| 5 | 500 | >1,000 | 700 | 620 | 580 |
| 10 | 510 | >1,000 | 820 | 630 | 630 |
| 15 | 670 | >1,000 | >1,000 | 640 | 650 |
| 20 | 630 | >1,000 | 900 | 690 | 700 |
| 30 | 640 | (1) | 980 | 710 | 740 |

[1] Poor processability.

As can be seen from the results shown in Table 2, the durability of various plastics can be remarkably enhanced by the addition of finely divided particles of above 5 in mohs' hardness.

What is claimed is:

1. In a cassette comprising an enclosed magnetic recording tape wherein the cassette contains a regulating plate which contacts the edge of a magnetic recording tape during winding, the improvement which comprises a regulating plate which is a plastic plate containing finely divided particles of above 5 in mohs' hardness dispersed therein.

2. The cassette of claim 1 wherein the powdery particles have an average particle size of below 10μ.

3. The cassette of claim 2 wherein the plastic plate is prepared from a material selected from the group consisting of polyacetals, polytetrafluoroethylenes, polyamides, polyethylenes and polypropylenes.

4. The cassette of claim 3 wherein the particles are selected from the group consisting of $Cr_2O_3$, $Al_2O_3$, SiC, α-$Fe_2O_3$ and $SiO_2$.

5. The cassette of claim 4 wherein the material is a polytetrafluoromethylene and wherein the particles are $Cr_2O_3$.

References Cited

UNITED STATES PATENTS

| | | | |
|---|---|---|---|
| 2,804,508 | 8/1957 | Mastling et al. | 179—100.2Z |
| 3,027,110 | 3/1962 | Andrews | 242—210 |
| 3,423,039 | 1/1969 | Zielke | 242—55.19A |
| 3,502,284 | 3/1970 | Loewenberg et al. | 242—199 |

LEONARD D. CHRISTIAN, Primary Examiner

U.S. Cl. X.R.

242—210